Figures 1, 2:
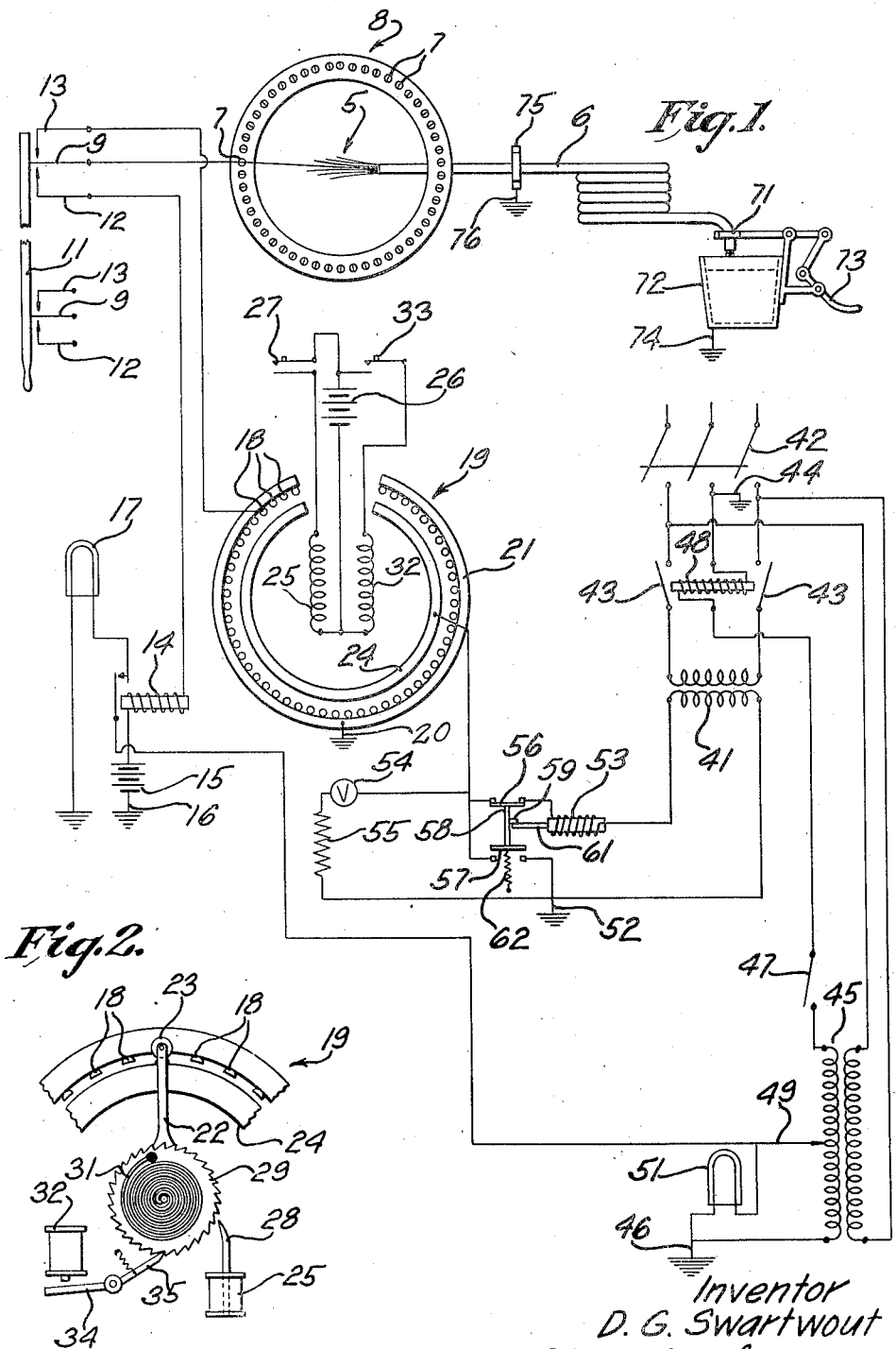

Inventor
D. G. Swartwout
By H. G. Whitehorn Att'y.

Patented Oct. 23, 1934

1,977,703

UNITED STATES PATENT OFFICE 1,977,703

METHOD OF AND APPARATUS FOR ELECTRICAL TESTING

Donald G. Swartwout, Cicero, Ill., assignor to Western Electric Company, Incorporated, New York, N. Y., a corporation of New York Application January 7, 1932, Serial No. 585,232

12 Claims. (Cl. 175—183)

This invention relates to a method of and apparatus for electrical testing and more particuladly to a method of and apparatus for making breakdown and continuity tests on cables.

Cables, such as used in telephone communication systems, frequently contain several hundred individual conductors insulated from each other and enclosed in a conducting sheath and before the cables are put into service they must be tested to insure that each conductor is continuous from one end of the cable to the other and that each conductor is properly insulated from every other conductor and from the sheath. In order to make these tests it is essential that each conductor, as well as the sheath, be connected into a testing circuit.

Objects of the invention are to provide an effective and efficient method of and apparatus for making a plurality of tests on a cable.

In accordance with one embodiment of the invention, an apparatus is provided by means of which the method may be practiced wherein one end of each of the conductors is connected to an individual contact on a fixture which may be connected to different apparatus for different tests, while the other ends of the conductors are immersed in a common conducting bath for one test and fanned out so as to be electrically disconnected for another test.

It is believed that a complete understanding of the invention may be had by reference to the following description taken in conjunction with the accompanying drawing, in which Fig. 1 is a schematic view of an apparatus embodying the invention, and Fig. 2 is a fragmentary detail view of a contact switch employed in the apparatus of Fig. 1.

The apparatus may be used for determining the continuity and dielectric strength of the conductors of a cable. A cable usually consists of a large number of individually insulated conductors 5 surrounded by a conducting sheath 6. In order to test the conductors, the ends of the conductors at one end of the cable are fanned out and each conductor is attached to a contact element or terminal 7 of a contact fixture 8. These terminal or contact members are preferably knife clips of a type well known in the art, which cut through the insulation when a conductor is inserted therein to make electrical contact with the conductor. The contact fixture 8 shows fifty contact elements arranged in a circular bank, although it is evident that a larger or smaller number may be used, depending upon the number of conductors in the cable to be tested. Each of the contact elements of the contact fixture is connected to a movable arm 9 of a multiple switch 11. For convenience of illustration only one connection is shown between a contact element 7 and one movable arm of the multiple switch, since all of the contact elements are connected in the same way, each to a movable arm of the switch. Associated with each of the movable arms of the multiple switch is a pair of stationary contact arms and 12 and 13. The stationary contact arms 12 lead to relays 14 through a source of energy, such as a battery 15, and to ground 16. Thus in a testing apparatus, as illustrated, having fifty contact elements 7, there will be fifty relays 14. Each of the relays 14 is adapted to establish a circuit when energized through a lamp 17 or other suitable indicating device.

The stationary contact arms 13 lead to contact elements 18 of a contact switch 19. All of the contact elements 18 of the contact switch normally rest against a ring 21, which is grounded at 20. The contact switch 19 has a pivotally mounted insulated arm 22 carrying a roller 23, which upon rotation of arm 22 successively disengages each of the contact elements 18 from the grounded ring 21 and engages it with a high potential ring 24. In the schematic illustration of Fig. 1, the rings 21 and 24 are shown discontinuous, although in practice they are preferably made continuous, as shown in Fig. 2. In order to rotate the arm 22, an electromagnet 25 is provided which is energized from a battery 26 upon closing a push button stepping switch 27. Upon closure of the stepping switch 27, electromagnet 25 is energized causing an armature 28 to actuate a ratchet wheel 29 one step and advance the arm 21 to release one contact element 18 and actuate the following contact element. The ratchet wheel 29 and arm 22 are connected to a spiral spring 31 and in order to return the arm 22 to its original position, a release coil 32 is energized by closing a push button release switch 33. This actuates an armature 34 for disengaging a pawl 35 from the ratchet wheel, allowing the arm 22 to return to its original position.

In order to provide a source of high potential energy for the breakdown test, a step-up transformer 41 is provided, the primary winding of which may be connected to an alternating current source (not shown) by closing a main switch 42 and an auxiliary switch 43. The source of alternating current is shown as a three phase source with the central line grounded at 44.

In order to close the switch 43, a second transformer 45 is provided which is connected to the outside lines of the three phase alternating current source. One side of the secondary winding of this transformer is grounded at 46 and the other side of the transformer leads through a switch 47 to a relay 48 and to ground 44. Thus when the switch 47 is closed, the coil of relay 48 will be energized to close the switch 43. The secondary of transformer 45 is provided with a center-tap 49 and a lamp 51 is connected from the center-tap to ground 46. A conductor also leads from the center-tap 49 to the contacts of relays 14 to energize lamps 17 when the relays are energized. Lamp 51 is illuminated whenever switch 42 is closed to indicate that a potential is impressed on the contacts of relays 14.

The secondary winding of transformer 41 is connected at one side to ground 52, while the other side of this transformer leads through a circuit breaker 53 to the high potential ring 24 of contact switch 19. A voltmeter 54 is connected across the high potential ring 24 and ground 52 and is preferably provided with a multiplying resistance 55. The circuit breaker 53 is provided with two switch arms 56 and 57 interconnected by a bar 58 having a stop 59. The armature of the circuit breaker magnet is provided with an arm 61 which engages stop 59 and holds the circuit breaker in the position shown against the tension of a spring 62. When the circuit breaker is in the position shown, a high potential will be applied to ring 24, which will be indicated by the voltmeter 54; however, when the current through the circuit breaker exceeds a predetermined value, such as caused by the short circuit of a conductor in the cable, arm 61 will be withdrawn from stop 59, breaking the circuit from the transformer 41 to ring 24 and applying ground to both sides of the voltmeter and to ring 24.

In testing the conductors of the cable for continuity, main switch 42 is closed, but switch 47 and consequently switch 43 is open. Thus the high potential is not applied to ring 24 of switch 19 during this test but the primary of transformer 45 will be energized and, therefore, lamp 51 will be illuminated and a potential will be applied to the movable contacts of relays 14. One end of all of the conductors is then connected to the contact elements 7 of contact fixture 8. The other end of the cable is then placed in a clamp 71 pivotally mounted on a container 72. The clamp 71 is connected by a suitable link mechanism to a foot pedal 73 so that upon depressing the foot pedal, the clamp 71, together with the end of the cable and the ends of the conductors, are lowered into container 72. This container is grounded at 74 and contains a conducting liquid, such as a salt solution, which makes a common connection with all of the conductor ends at this end of the cable. With the cable conductor connected, as just described, the multiple switch 11 is moved to its lower position, thereby connecting each conductor through one of the relays 14 to battery 15 and ground 16. If all of the conductors are continuous, all of the relays 14—14 will be energized and all of the lamps 17 will be illuminated. However, if any one of the conductors is not continuous, the particular lamp associated with that conductor will not be illuminated, thus making it a simple matter to determine which one of the conductors is not continuous.

In order to test the insulation of each conductor with respect to all of the other conductors and with respect to the sheath, the end of the cable is withdrawn from the conducting bath in container 72 and the ends of the conductors are fanned out so that none of the ends will be in contact with each other. A clamp 75 is then clamped over the end of the cable adjacent the contact fixture 8. This clamp is grounded at 76 and may also be connected to the sheath when the continuity test is made, although this is not essential. Switch 47 is then closed to close switch 43 and apply a high potential to ring 24 of switch 19. The multiple switch 11 is now moved to its upper position, engaging the multiple arms 9 with the stationary contact arms 13 of the switch. This connects each of the conductors of the cable being tested to one of the contact elements 18 of contact switch 19.

As pointed out above, the contact elements are normally grounded due to the fact that they are in engagement with grounded ring 21. Now in order to apply a high potential to each of the conductors successively while retaining the other conductors and the sheath at ground potential, the stepping switch 27 is actuated, causing each contact element to be successively disengaged from the grounded ring 21 and engaged with the high potential ring 24, the voltmeter indicating the voltage applied to each conductor. If the insulation is defective between any particular conductor and another conductor, or between any particular conductor and the sheath 6, a current will flow through the circuit breaker causing it to act to immediately apply the ground to this conductor so as to prevent a short circuit current flowing through the conductor for any length of time. At the same time the voltmeter 54 will have ground applied to both sides thereof, thereby causing it to return to zero to indicate that one of the conductors is short circuited. The particular conductor short circuited may be determined from the position of the arm 22 of the contact switch 19. After the breakdown test has been made, push button switch 33 is depressed to return the arm of the contact switch to its normal position and the cable is disconnected from the apparatus.

The invention provides a simple and convenient method and apparatus for testing cables for continuity and breakdown and requires that the ends of the conductors be connected to the contact elements of the contact fixture only once for the several tests.

It will be understood that the nature and embodiment of the invention herein described and illustrated is merely a convenient and useful form of the invention and that many changes and modifications may be made therein without departing from the spirit and scope of the invention.

What is claimed is:

1. A method of testing a sheathed cable which comprises making electrical contact with one end of the conductors of the cable, applying an electromotive force to the conductors to determine their continuity, retaining the electrical contact with the ends of the conductors, and applying a potential between each conductor and the remaining conductors and the sheath to determine the insulation of the conductors and the sheath.

2. A method of testing a cable which comprises making electrical contacts with one end of the conductors of the cable, applying an electromotive force to said contacts to determine the continuity of the conductors, and applying a high potential to said contacts to determine the dielectric strength of the insulation of the conductors.

3. A method of testing a cable which comprises making individual electrical contacts with one end of the conductors of the cable, making a common electrical connection with the other end of the conductors, applying an electromotive force to the conductors to determine their continuity, removing the common connection and retaining the individual contacts, and applying a high potential to the conductors to determine the dielectric strength of the insulation of the conductors.

4. A testing apparatus comprising a fixture having a plurality of contact elements for receiving conductor ends of a cable, means for applying a breakdown test to the conductors, means for applying a continuity test to the conductors, and means for selectively connecting the contact elements of the fixture to the means for applying the breakdown test or the means for applying the continuity test.

5. A testing apparatus comprising a fixture having a plurality of contact elements, a testing device including a contact element for each contact element in said fixture, a grounded member normally engaged by each contact element of said testing device, a high potential member, and means for successively disengaging each contact element from the grounded member and engaging it with the high potential member.

6. A testing apparatus comprising means including a plurality of contact elements for receiving conductor ends of a cable, a testing device having a plurality of contact elements, each of which is electrically connected to a contact element of the means for receiving the conductor ends, means for grounding all of the contacts of said testing device, and means for successively applying a high potential to each of the contacts of the testing device while retaining the other contacts at ground potential.

7. A testing apparatus for testing a cable comprising a conducting bath for receiving one end of the conductors of the cable, a terminal fixture for receiving the other end of the conductors individually, a plurality of testing circuits connectible to said terminal fixture for simultaneously testing all of said conductors for continuity, and a single testing circuit connectible to said terminal fixture for successively testing each conductor with respect to all of the other conductors for insulation.

8. A testing apparatus for testing a cable comprising means for making a common connection with one end of all of the conductors of the cable, a terminal fixture for receiving the other end of the conductors individually, a plurality of testing circuits connectible to said terminal fixture for simultaneously testing all of said conductors for continuity, and a single testing circuit connectible to said terminal fixture for successively testing each conductor with respect to all of the other conductors for insulation.

9. A testing apparatus for testing a cable comprising a conducting bath of a salt solution for making a common connection with all of the conductors at one end of the cable, an electrical connection through said conducting bath, means for making individual connections with the conductors at the other end of the cable, and a testing device connectible to said connections for testing the conductors.

10. A testing apparatus for testing a cable comprising means for making individual contact with each conductor, a plurality of testing circuits each including an indicating device and connectible to said individual contacts for simultaneously testing all of said conductors for continuity, and a single testing circuit including an indicating device for successively testing each of said conductors with respect to the others for insulation.

11. A testing apparatus for testing the insulation of a conductor comprising a testing circuit, means in said circuit for applying a high potential to the conductor, and means for interrupting the circiut through said conductor and applying ground to said conductor when a breakdown of the insulation occurs.

12. A testing apparatus for testing cables comprising means for making individual contacts with one end of the conductors of the cable, means for testing the conductors for breakdown, means for testing the conductors for continuity, and a multiple switch for selectively connecting either of said testing means with said individual contacts.

DONALD G. SWARTWOUT.